Jan. 26, 1960
H. FRIEDMAN
2,922,911
APPARATUS FOR GAS ANALYSIS
Filed Aug. 31, 1956
2 Sheets-Sheet 1
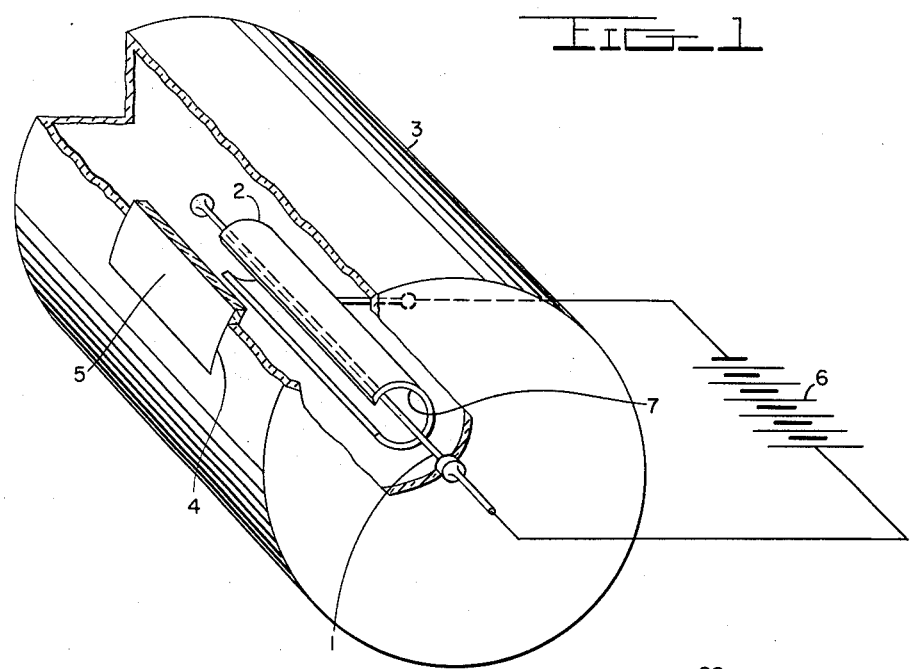
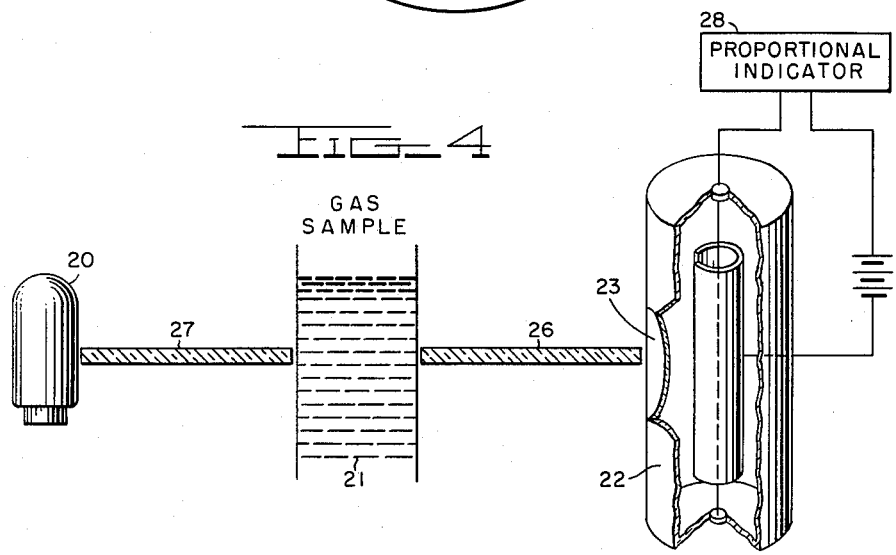
INVENTOR
HERBERT FRIEDMAN
BY
*Richard C. Reed* ATTORNEYS

INVENTOR
HERBERT FRIEDMAN

BY
*Richard C. Reed* ATTORNEYS

United States Patent Office 2,922,911
Patented Jan. 26, 1960

2,922,911

APPARATUS FOR GAS ANALYSIS

Herbert Friedman, Arlington, Va.

Application August 31, 1956, Serial No. 607,531

2 Claims. (Cl. 313—93)

(Granted under Title 35, U.S. Code (1952), sec. 266)

The invention described herein may be manufactured and used by or for the Government of the United States of America for governmental purposes without the payment of any royalties thereon or therefor.

This invention relates to apparatus for gas analysis through radiation absorption.

This application is a continuation-in-part of my copending applications Serial No. 292,599, filed June 9, 1952, now abandoned, and Serial No. 433,308, filed May 28, 1954, the disclosures of which are hereby incorporated by reference.

It has long been recognized that various gases will absorb radiation more strongly at one or more particular monochromatic wavelengths or narrow bands. This identifying property of the gas is known as a characteristic absorption band and is made use of by this invention to provide a method and apparatus for analyzing gas mixtures to determine the presence or amount therein of one or more gases which have a characteristic absorption band in a portion of the far ultraviolet region hereinafter identified.

It is an object of the present invention to provide an apparatus for analysis of gas mixtures through absorption of radiation in a portion of the far ultraviolet region. It is a further object to provide an apparatus of this kind which can be employed to determine the presence or amount of oxygen or water vapor in gas mixtures. It is also an object to provide an apparatus of this kind for determining the amount of oxygen or water vapor in a sample of air.

These and other objects are accomplished by the apparatus of the present invention which, broadly stated, comprises a source of heterochromatic ultraviolet radiation arranged to pass the radiation through a sample of the gas mixture to be analyzed and a radiation filter and radiation detector acting conjointly to select from the radiation transmitted by the sample of the gas mixture, a narrow spectral band of substantially monochromatic radiation which is within the range of from about 1000 to 1700 Angstroms wavelength and corresponds essentially to a characteristic absorption band for the gas under determination. The radiation detector is of the ionizable gas filled type and has a gas filling which is selectively responsive to the radiation of the narrow spectral band.

For a more complete understanding of the invention herein, reference is had to the accompanying drawings taken in conjunction with the description which follows.

In the drawings in which like numerals indicate like parts in the several views:

Fig. 1 is a schematic showing of a radiation detector of an apparatus of the invention, with parts being broken away to show the construction of the tube.

Fig. 4 is a schematic arrangement of parts of an apparatus in accordance with the invention.

Figure 2:
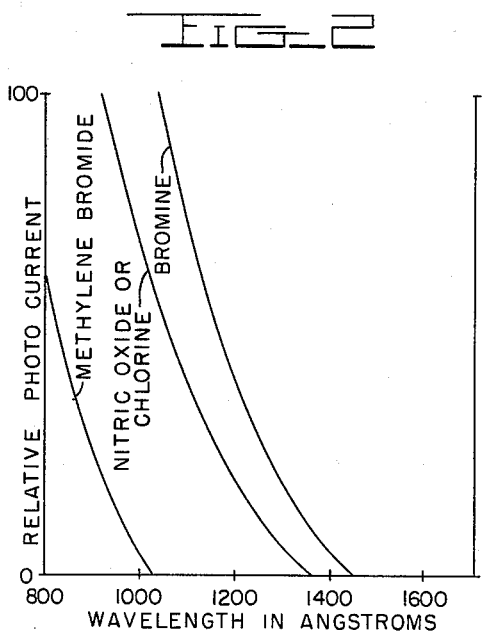
Fig. 2 is a graph of the spectral response of a radiation detector of an apparatus of the present invention as determined by certain gas filling in the tube.

Referring to Fig. 1 of the drawing, the radiation detector is of the ionizable gas filled type and has a wire anode 1 axially disposed in a hollow cylindrical cathode 2. The anode and cathode are sealed within a gas-tight envelope or tube 3 which is provided with an opening 4 in which radiation window 5 is supported.

A source of potential is supplied at 6. Depending upon the voltage applied across the electrode space 7 between the anode and cathode and the use of a suitable ionizable gas filling in the tube, the radiation detector can be operated as an ionization chamber, a proportional counter or as a Geiger counter in apparatus of the invention. The voltages for operation of the radiation detector for the three different types of counting are in accordance with known practice.

The cathode 2 may be made of a metal such as copper. When the radiation detector is operated either as a proportional counter or a Geiger photon counter, it is necessary to suppress the detection of photoelectrons emitted by the cathode under the influence of near ultraviolet light. Photoelectrons from the cathode may be prevented from triggering counts by addition of a minor proportion of an electronegative gas to the counting gas mixture. An electronegative gas is a gas whose atoms have an affinity for electrons and tend to become attached to the latter to form negative ions. The presence of the electronegative gas in the gas filling of the counter tube has an effect equivalent to raising the work function of the cathode, which is the minimum energy which must be supplied to an electron in order to have it escape or be emitted from the cathode. Since the amount of energy which incident radiation will impart to electrons in the cathode is proportional to the frequency of the incident radiation, there is a definite relationship between the frequency of the incident radiation and the work function of the cathode. A frequency value for incident radiation exists, corresponding to the work function of the cathode, below which insufficient energy will be imparted to the electrons to release them from the cathode. This frequency value or limit is defined herein as the photoelectric threshold frequency of the radiation detector.

The presence of even a small amount of an electronegative gas with the rare gas, e.g., argon, neon, helium, etc., in the tube of a photon counter will serve to raise the photoelectric threshold frequency for the counter. In this way predetermined frequency response levels can be established for the photon counter depending upon the particular electronegative gas additive and up to a certain limit, also, by the amount thereof present in the gas filling. Examples of suitable electronegative gases for the purpose of bringing about this change in the photoelectric threshold of the photon counter are oxygen, chlorine, bromine, ammonia, sulphur dioxide and the halogenated hydrocarbons such as methylene bromide. The addition of mere traces of the enumerated gases, from about .01 to 5 mm. Hg partial pressure when used alone, of from 0.1 to 4% by volume to other gases is sufficient to bring about a large order change in the photoelectric threshold of the photon counter. Addition of further amounts of the electronegative gas produces further change in the threshold, though to a less proportionate extent than that produced by the addition of the initial traces of the gas, and ultimately the effect of continued addition of the electronegative gas is masked by secondary effects.

In the graph of Fig. 2 there are shown a number of photoelectric thresholds for a photon counter produced by the addition of traces of the identified electronegative gases to a gas filling of a rare gas. The ordinate represents the photoelectron response in terms of counting rate. The abscissa represents the wavelength of the incident radiation striking the cathode in terms of Angstrom units.

With the use of a photon counter of the kind described above provided with an established photoelectric threshold frequency through the presence of an electronegative gas in the filling of the tube, the longwave limit is provided for the narrow spectral band to be selected from the radiation transmitted by the sample of the gas mixture.

The radiation filter serves to establish the short wave limit for the narrow spectral band selected from the radiation transmitted by the sample of the gas mixture and is placed in optical alignment with the cathode 2. Suitably, it is the window 5 in the tube of the counter.

Figure 3:
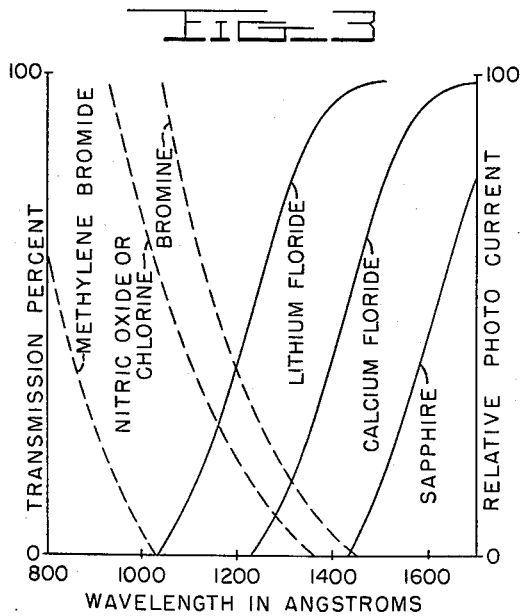
Fig. 3 is a graph depicting the radiation transmission for a number of filters useful in apparatus of the invention correlated to the spectral responses set forth in Fig. 2, the latter being shown in dotted lines.

Illustrative combinations of photon counter and radiation filter are depicted in the graph of Fig. 3 in terms of particular electronegative gas additives in the gas filling, on the one hand, and particular filter materials, on the other.

Referring to the graph of Fig. 3, an illustrative combination of filter and photon counter is lithium fluoride for window 5 in the tube and chlorine as the additive in the gas filling of the counter. This combination provides operation of the radiation detector exclusively in the narrow wavelength band extending from about 1100 to 1350 Angstroms, which is the approximate shortwave limit of transmission of lithium fluoride, on the one hand, and the approximate longwave limit of operation or photoelectric threshold wavelength established by the chlorine additive, on the other.

An apparatus in accordance with the invention is shown in schematic arrangement in Fig. 4 wherein a source 20 of heterochromatic ultraviolet radiation is shown in the form of a hydrogen arc discharge tube disposed at one side of a sample of a gas mixture 21. The sample of gas mixture may be confined in an absorption cell i.e., a holder having walls which transmit the radiation from the source 20, or it may be free in the sense that the determination is done within the body of the gas mixture, such as analysis for oxygen or water vapor in the atmosphere. The radiation detector 22 is disposed on the other side of the sample 21 so as to intercept radiation from the source 20 which has been transmitted by the sample. Filter 23 establishing the shortwave limit for the narrow spectral band is shown as the incident radiation window mounted in the tube of the radiation detector 22. A modification of the arrangement is also shown in which a long pencil form filter 26 extends from closely adjacent the sample 21 to closely adjacent the filter window 23. Optionally, another pencil form filter 27 may in like fashion extend between the radiation source 20 and the sample 21 to complement the filter 26. In this way the pencil form filters 26 and 27 provide a confined radiation transmission path from the source 20 to sample 21 and thence to the detector 22, while at the same time defining the shortwave limit for the radiation received by the detector 22. When filter 26 is used, the window 23 may be transparent to radiation generally or it may constitute a supplementary filter.

The radiation detector 22, as previously mentioned, may be an ionization chamber. In such case the gas filling in the tube or envelope 3 contains a vapor or a gas which has an ionization potential of less than 12 electron volts. The gas filling may be comprised only of such a constituent or, more generally, will be made up of a proportion of the same in admixture with a rare gas, such as neon, helium, argon, etc., an amount equal to about 0.1 mm. to 30 mm. Hg partial pressure being sufficient for operation of the detector as an ionization chamber at the usual applied voltages. The vapor or gas of the aforesaid ionization potential will generally be an organic compound. However, a limited number of gaseous inorganic compounds, such as nitric oxide, are also usable as the photo-ionizable constituent for the tube. The threshold radiation response for the ionization chamber may be established by choice in respect to the aforesaid vapor or gas in the gas filling. Examples of polyatomic organic compounds, the vapor of which may be used in the gas filling for the ionization chamber, and the ionization potential of each in electron volts are

| | |
|---|---|
| Benzene | 9.24 |
| Toluene | 8.92 |
| Monochlorobenzene | 8.8 |
| Ethylbenzene | 8.75 |
| Isopropylbenzene | 8.60 |
| Terbutylbenzene | 8.5 |
| Xylene | 8.3 |
| B-methylnaphthalene | 8.0 |
| Formic acid | 11.29 |
| Formaldehyde | 10.88 |
| Acetaldehyde | 10.23 |
| Methyl alcohol | 10.8 |
| Ethyl alcohol | 10.7 |
| Dimethylether | 10.5 |
| Diethylether | 10.2 |
| Acrolein | 10.2 |
| Acetone | 10.1 |

An illustrative combination of a radiation filter, which may be window 23 in the ionization chamber detector 22, and a gas filling in the ionization chamber for apparatus of the invention is lithium fluoride transmitting at about 1100 Angstroms wavelength and diethylether with a rare gas, the diethylether having a long-wavelength cut-off at about 1210 Angstroms. Another such combination is sapphire ($Al_2O_3$) with a short-wavelength cut-off at about 1425 Angstroms and xylene as the gas filling in the ionization chamber, xylene having a long-wavelength cut-off at about 1500 Angstroms.

Apparatus as herein described is useful for spectroanalysis of gas mixtures where the component or components to be detected have a characteristic absorption band in the range of from about 1000 to 1700 Angstroms wavelength. This analysis is accomplished by observing which bands of this spectral region are absorbed by an unknown gas mixture. The presence and amount of a given component is indicated by the attenuation of radiation according to the well known exponential absorption law.

In addition to utility in spectroanalysis as above described, apparatus in accordance with this invention can be employed for quantitative determination of components of gas mixtures, such as, for example, oxygen and water vapor in air.

Following Beer's law as applied to gases, the amount of radiation transmitted by a gas sample which strikes the detector decreases in a generally inverse ratio (following the exponential absorption law) with increase in the amount of the absorbing gas between the source of the radiation and the detector, the distance between the source and the detector being fixed. Thus, calibration of the response of the radiation detector can be made in terms of the amount of a gas or gases in a gas mixture. In an absorption or sample cell of fixed size, the mass of the absorbing gas is proportional to the pressure and the detector may be so calibrated. If the cell pressure is maintained constant by suitable pressure control means, the absorbing component gas may vary by composition variation in the enclosed gas mixture. The detector may then be calibrated in terms of percent composition of the varying component. Measurement of the amount, density or percent composition of a gas component in a gas mixture may be obtained by calibrating the response of a proportional indicator 28 for the radiation detector.

As a particular application of an apparatus in accordance with the invention, molecular oxygen is known to be highly absorbent of radiation in the wavelength band from about 1400 to 1600 Angstroms. Water vapor, on the other hand, exhibits relatively low absorption in this wavelength band. An apparatus as illustrated in Fig. 4 employing a sapphire window 23 in the detector 22 and as the latter, either a photon counter having about 0.1% by volume of bromine as the gas-additive in the gas filling or an ionization chamber with a gas filling of xylene, would serve as a highly satisfactory oxygen density meter in the analysis of unconfined air, or where the air sample is contained in an adsorption cell under constant pressure, a percentage oxygen indicator.

To determine the amount of water vapor in a mixed gas sample containing oxygen, it is preferred to employ radiation at 1216 Angstroms wavelength. At this wavelength, water vapor is highly absorbent, a narrow highly transmissive band occurs in oxygen, and highly efficient source is available in the Lyman alpha line of excited hydrogen.

An electronegative gas component giving an effective high wavelength sensitivity cut-off at about 1340 Angstroms is nitric oxide. The counter operates excellently with 10% NO, 90% rare gas in the filling. The NO may exceed 30%, but is not satisfactory in amounts less than 1%. Such a counter would be used with a lithium fluoride filter for selective response to a limited band from 1050 to 1340 Angstroms, including the desired 1216 Angstroms.

The high wavelength cut-off characteristic of nitric oxide-rare gas fillings is intermediate between chlorine and bromine tubes described in application Serial No. 292,599, now abandoned (see Fig. 2 thereof). The chlorine tube is also useful with a lithium fluoride filter at 1216 Angstroms.

It has been discovered that a further admixture of water vapor to the halogen counter fillings described above increases the sensitivity of the tubes by a factor of 10 to 100 times without materially affecting the frequency limits involved in their operation. Water vapor in amounts of a fraction of a millimeter to 5 millimeters of mercury in the filling mixture is effective for this purpose. Such water vapor-chlorine-rare gas counter is also particularly effective for 1216 Angstroms response with a lithium fluoride filter.

In the system shown in Fig. 4, the filter 27 may be a cell containing pure oxygen which is effective to block the hydrogen radiation substantially totally with the exception of the desired Lyman alpha line at 1216 Angstroms.

While a conventional hydrogen discharge tube, normally containing the gas at a pressure of one to a few millimeters of mercury, may be used as source 20, such tubes radiate much energy at undesired frequencies. It has been found that atomic hydrogen may be excited to emit 1216 Angstroms radiation substantially free of adjacent molecular hydrogen lines in a discharge tube filled with any of the rare gases and 10% hydrogen at the same range of total pressures as conventionally used. The undesired adjacent hydrogen radiation is quenched with retention of the desired Lyman alpha line in tubes having a minor proportion, from a trace to above 10%, of hydrogen with the remainder of the filling rare gas. For the specific application to detecting water vapor in the presence of oxygen, neon and krypton are preferred rare gases because they themselves do not emit in the adjacent regions around 1216 Angstroms.

Since changes and modifications can be made in the practice of the invention without departing from the spirit and scope thereof, it is intended that specific embodiments of the invention appearing in the above description shall be taken by way of illustration and not in limitation except as may be required by the following claims.

What is claimed is:

1. An ultraviolet radiation detector comprising a sealed envelope, a pair of spaced electrodes within said envelope, a window in said envelope, said window being transparent to far ultraviolet radiation above about 1000 Angstroms wavelength, and a gas filling for said detector comprising a photoionizable gas having an ionization potential of less than 12 electrons volts.

2. An ultraviolet radiation detector comprising a sealed envelope, a pair of spaced electrodes within said envelope, a window in said envelope transparent to far ultraviolet radiation above about 1000 Angstroms, and a gas filling for said detector comprising a rare gas and a photoionizable gas having an ionization potential of less than 12 electron volts.

References Cited in the file of this patent

UNITED STATES PATENTS

| | | |
|---|---|---|
| 2,265,357 | Demarest | Dec. 9, 1941 |
| 2,461,254 | Bassett | Feb. 8, 1949 |
| 2,468,638 | Rosenbaum | Apr. 26, 1949 |
| 2,479,201 | Bleeksma | Aug. 16, 1949 |
| 2,507,359 | Weisz | Mar. 9, 1950 |
| 2,552,723 | Koury | May 15, 1951 |
| 2,654,041 | McCurdy et al. | Sept. 29, 1953 |
| 2,712,088 | Whitman | June 28, 1955 |
| 2,764,692 | Miller | Sept. 25, 1956 |